United States Patent [19]

Seidler et al.

[11] 4,443,369

[45] Apr. 17, 1984

[54] SULPHUR DYESTUFFS

[75] Inventors: Helmut Seidler, Bonn; Manfred Söll; Klaus Wunderlich, both of Leverkusen, all of Fed. Rep. of Germany

[73] Assignee: Bayer Aktiengesellschaft, Leverkusen, Fed. Rep. of Germany

[21] Appl. No.: 284,918

[22] Filed: Jul. 20, 1981

Related U.S. Application Data

[63] Continuation of Ser. No. 43,058, May 29, 1979, abandoned.

[30] Foreign Application Priority Data

Jul. 21, 1978 [DE] Fed. Rep. of Germany ....... 2832215

[51] Int. Cl.$^3$ .............................................. C07G 17/00
[52] U.S. Cl. ..................................... 260/131; 260/369
[58] Field of Search ............................... 260/131, 369

[56] References Cited

U.S. PATENT DOCUMENTS

| 597,983 | 1/1898 | Isler | 260/131 |
| 999,045 | 7/1911 | Laska | 260/131 |
| 1,061,714 | 5/1913 | Wolff | 260/131 |

*Primary Examiner*—Charles F. Warren
*Assistant Examiner*—Y. Harris-Smith
*Attorney, Agent, or Firm*—Sprung, Horn, Kramer & Woods

[57] ABSTRACT

Sulphur dyestuffs which can be obtained by sulphurizing, in a manner which is in itself known, the residual mixtures obtained on dinitrating anthraquinone or on dinitrating by-products from the preparation of 1-nitroanthraquinone and partially isolating 1,5- and 1,8- and, if appropriate, 1,6- and 1,7-dinitroanthraquinones, optionally after prior reduction and/or hydroxylation and/or introduction of nitro groups, and their use in dyeing cellulose or material containing cellulose.

1 Claim, No Drawings

SULPHUR DYESTUFFS

This is a continuation of application Ser. No. 043,058, filed May 29, 1979 now abandoned.

The present invention relates to new sulphur dyestuffs, processes for their preparation and their use for dyeing cellulose or material containing cellulose.

It is known to prepare sulphur dyestuffs by treating nitroanthraquinones with sodium sulphide/sulphur. An example of such a dyestuff is C.I. 53,330 anthraquinone black, which is obtained by sulphurizing 1,5-dinitroanthraquinone or the mixture obtained on dinitrating anthraquinone. The said dyestuff and similar dyestuffs known from German Pat. No. 91,508 dye cotton black.

The new sulphur dyestuffs can be obtained by sulphurizing, in a manner which is in itself known, the residual mixtures obtained on dinitrating anthraquinone or on dinitrating by-products from the preparation of 1-nitroanthraquinone and partially isolating 1,5- and 1,8- and, if appropriate, 1,6- and 1,7-dinitroanthraquinones, optionally after prior reduction and/or hydroxylation and/or introduction of nitro groups.

Of particular importance are those sulphur dyestuffs which can be obtained by sulphurizing residual mixtures which contain 15 to 70% by weight, preferably 25 to 60% by weight, of 1,6/1,7-dinitroanthraquinones, 70 to 15% by weight, preferably 60 to 25% by weight, of 1,5/1,8-dinitroanthraquinones, the total content of 1,X- (X=5, 6, 7, 8) dinitroanthraquinones being 30 to 95% by weight, preferably 50 to 85% by weight, and 2 to 10% by weight, preferably 2 to 6% by weight, of 2,6/2,7-dinitroanthraquinones.

The residual mixtures are known (see, for example, DE-OS (German Published Specification) No. 2,637,733, DE-OS (German Published Specification) No. 2,351,590 and DE-OS (German Published Specification) No. 2,738,824). They are reaction mixtures from the industrial dinitration of anthraquinone, from which the desired 1,5- and 1,8-dinitroanthraquinones and, if appropriate, also the 1,6- and 1,7-dinitroanthraquinones have been isolated. The residual mixtures can also be subjected to further purification operations, such as, for example, those which are known from DE-OS (German Published Specification) No. 2,738,824, before the sulphurization.

The 1,X- (X=5, 6, 7, 8)- and X,Y- (X=5, 6, 7 and 8; Y=1 and 2) dinitroanthraquinones known from DE-OS (German Published Specification) No. 2,637,733 are particularly suitable for the preparation of the sulphur dyestuffs according to the invention. The 1,X-dinitroanthraquinones are obtained, for example, by cooling the combined filtrates from the isolation of 1,8-dinitroanthraquinone to about 5° to about 70° C. and filtering off the mixture which crystallises out. The X,Y- (X=5, 6, 7 and 8; Y=1 and 2) dinitroanthraquinones are obtained, for example, by distilling to dryness, in vacuo, the combined filtrates from the isolation of 1,X-dinitroanthraquinones.

The residual mixtures obtained on nitrating by-products from the preparation of 1-nitroanthraquinone and partially isolating 1,5- and 1,8- and, if appropriate, 1,6- and 1,7-dinitroanthraquinones can also be used as starting materials for the preparation of the sulphur dyestuffs according to the invention. The working up of these reaction mixtures to give the residual mixtures which can be employed according to the invention is known, for example, from DE-OS (German Published Specification) No. 2,351,590.

Valuable new sulphur dyestuffs are also obtained by subjecting the residual mixtures to a partial reduction, some of the nitro groups being reduced to give amino groups in a manner which is in itself known. Those residual mixtures in which some of the nitro groups present have been substituted by hydroxyl groups, or, under certain circumstances, into which further nitro groups have been introduced, can also be used as starting materials. Corresponding substitution processes are known from German Patent Specification No. 842,793 or DE-OS (German Published Specification) No. 2,254,199.

In this case, the residual mixture is treated with a metal nitrite, such as, for example, sodium nitrite or potassium nitrite, or with a metal oxide, such as calcium oxide or magnesium oxide, in a solvent at elevated temperature.

The sulphurization of the residual mixtures is carried out in a manner which is in itself known. Detailed working instructions are to be found in Ullmanns Enzyklopädie der technischen Chemie (Ullmann's Encyclopaedia of industrial Chemistry), Urban and Schwarzenberg, Munich/Berlin, 3rd edition, volume 15, 1964, page 558-556; N. N. Woroshzow, Grundlage der Synthese von Zwischenprodukten und Farbstoffen (Principle of the Synthesis of Intermediates and Dyestuffs), Akademie Verlag, Berlin, 1966, page 789-795, and also in DE-AS (German Published Specification) No. 1,023,840.

The following procedure has proved particularly advantageous: a melt of $Na_2S.9H_2O$ is initially prepared and sulphur is introduced therein, whilst stirring. The weight ratio of $Na_2S.9H_2O$ to sulphur can vary within wide ranges, namely from 10:1 to 2:1, preferably 8:1 to 5:1. The residual mixture which is to be sulphurized is then introduced slowly into the dark brown melt of the sodium polysulphide thus obtained. The weight ratio of residual mixture to sodium polysulphide can likewise vary within wide ranges, namely from 1:1 to 1:10; the reaction is advantageously carried out in the range from 1:2 to 1:6.

The introduction of the residual mixture into the sodium polysulphide melt is advantageously carried out in a temperature range from 80° to 100° C., whereupon a smooth reduction of the nitroanthraquinones takes place to give the corresponding aminoanthraquinones. When the reduction is complete, the temperature is raised to about 280° to 300° C. A liquid containing water thereby distils over; the melt becomes increasingly viscous and assumes the properties of a baked melt from about 220° C.

When the baked melt has been produced, working up can proceed in accordance with various methods. The baked dyestuff can be ground and, after standardisation, used directly for dyeing. However, the baked residue can also be taken up in water and the dyestuff precipitated in pure form from the resulting solution by adding acid, filtered off, washed and dried. A further possibility consists in taking up the powdered baked residue by heating in sodium sulphide solution, optionally with the addition of sodium thiosulphate, and employing the resulting black vat liquor for dyeing. The last method is particularly advantageous because the resulting dyeings are distinguished by outstanding levelness.

The new dyestuffs are particularly suitable for dyeing cellulose and material containing cellulose in olive-brown to green colour shades. They are particularly suitable for vat dyeing cotton. The fastness properties of the dyeings are excellent. The fastness to washing and light is to be singled out.

If residual mixtures which are partially hydroxylated and/or substituted by further nitro groups are used as the starting materials in the preparation of the new sulphur dyestuffs, the sulphur dyestuffs obtained have a shade, on cotton, which is distinctly shifted towards green, the magnitude of the green shift being dependent on the degree of hydroxylation. Very attractive green shades on cotton, having the best fastness properties, can be obtained in this way.

A shift of the colour shade, on cotton, from olive to green, using the sulphur dyestuffs according to the invention, with simultaneously improved clearness of the dyeings, can also be achieved by adding copper salts during the sulphurization of the residual mixtures or modified residual mixtures.

Furthermore, it should be mentioned that the preparation of the dyestuffs according to the invention is of considerable advantage, particularly also with regard to the increasing shortage of raw materials, because it is possible to prepare valuable dyestuffs from by-products which have no intrinsic value.

The percentage data in the following examples are given as percentages by weight.

EXAMPLE 1

400 g of $Na_2S \times 9H_2O$ are melted at about 85° C. 60 g of sulphur are introduced in portions into the melt, whilst stirring. After a brown-black sodium polysulphide melt has formed, 105 g of a residual mixture, from the industrial dinitration of anthraquinone, of the following composition:

| 1- | 1,6- | 1,7- | 2,6- | 2,7- | 1,5- | 1,8- | nitro-/dinitro-anthraquinone |
|---|---|---|---|---|---|---|---|
| 1.5 | 24.4 | 21.2 | 1.0 | 1.1 | 8.3 | 31.9 | % | are introduced in the course of about 2 hours at a melt temperature of 85° to 95° C.

When the introduction is complete, the mixture is stirred for 3 hours at 95° to 100° C. The temperature of the melt is then raised linearly to 210° C. in the course of 6 hours, about 260 ml of water distilling off. The melt is then heated to 270° to 280° C. in the course of a further 5 hours, whereupon it becomes increasingly solid. The temperature is kept at 270° to 280° C. for a further 4 hours.

After cooling, the baked product is removed and powdered. This yields 320 g of a black dyestuff having a sulphur content of 31%. The product is soluble in water or aqueous sodium hydroxide solution to give a brown-black colour. It is completely insoluble in organic solvents.

If the dyestuff is absorbed onto cotton in accordance with known methods, olive dyeings of high depth of colour are obtained. The dyeings have excellent fastness to light and washing.

EXAMPLE 2

The procedure followed is as described in Example 1. 100 g of the resulting sulphur dyestuff are heated under reflux in 800 g of HCl (14% strength) for 1 hour, whilst stirring. The product is then filtered off, washed with cold water until the washings are neutral and dried at 110° C. This yields 53.2 g of the purified, brown-black sulphur dyestuff having a sulphur content of 48%. If the dyestuff is absorbed onto cotton from a sodium sulphide vat, extremely deep olive dyeings having outstanding fastness properties are obtained. The dyestuff has the following elementary composition:

| C | H | N | O | S | |
|---|---|---|---|---|---|
| 37 | 1.6 | 5.4 | 5.7 | 47.8 | % |

EXAMPLE 3

The procedure followed is as described in Example 1. 100 g of the resulting sulphur dyestuff are introduced into a solution of 20 g of technical-grade sodium sulphide in 625 ml of water and the mixture is heated to 60° C., whilst stirring. 180 g of technical-grade sodium sulphide and 63 g of sodium thiosulphate.$5H_2O$ are subsequently added. After heating to 60° C. for one hour, a brown-black vat liquor is obtained which is suitable directly for dyeing cotton and gives olive-brown dyeings having excellent levelness and fastness.

EXAMPLE 4

240 g of sodium sulphide.$9H_2O$ are melted at about 85° C. 60 g of sulphur are stirred into the melt in portions, whilst stirring. 105 g of a nitroanthraquinone mixture of the following composition:

| 1- | 1,6- | 1,7- | 2,6- | 2,7- | 1,5- | 1,8- | nitro-/dinitro-anthraquinone |
|---|---|---|---|---|---|---|---|
| 3.8 | 30.7 | 26.2 | 1.2 | 1.3 | 5.5 | 21.2 | % | are introduced into the resulting melt in the course of about 70 minutes.

When the introduction is complete, the mixture is subsequently stirred for 2¼ hours at 88° to 94° C. The temperature of the melt is then raised linearly to 180° C. in the course of 3 hours and this temperature is maintained for 3 hours. The melt is heated to 270° C. in the course of a further 2 hours and then kept at 270° to 280° C. for 7 hours. A total of 190 ml of water distil off.

After cooling, the sulphur dyestuff is removed and powdered. This yields 251 g of a dark brown dyestuff having a total of 30.7% of sulphur (7% of elementary sulphur).

Absorption of the dyestuff onto cotton from a sodium sulphide vat in accordance with customary methods results in a deep, level olive-grey having excellent fastness to light and outstanding fastness to washing.

EXAMPLE 5

31.6 g of a nitroanthraquinone mixture of the following composition:

| 2,6- | 2,7- | 1- | 1,6- | 1,7- | 1,5- | 1,8- | nitro-/dinitro-anthraquinone |
|---|---|---|---|---|---|---|---|
| 1.87 | 2.13 | 3.1 | 35.95 | 22.72 | 5.01 | 19.47 | % | are introduced, at 86° to 90° C. and in the course of 35 minutes, to a melt of 300 g of sodium sulphide.$9H_2O$ and 40 g of sulphur.

The mixture is subsequently stirred at 90° C. for 1 hour and then heated to 160° C. in the course of 9 hours, whereupon 170 ml of water distil off. The mixture is then heated to 280° C. in the course of a further 3 hours and kept at 280° C. for 4 hours. A black-brown baked product results. After cooling, 300 ml of water are added, whereupon the dyestuff goes into solution. After adding 200 ml of HCl (32% strength) the solution is heated under reflux for 1 hour and the product is filtered off hot, washed with hot water and dried at 110° C. This yields 62 g of a sulphur dyestuff having a total of 61.5% of sulphur (14% of elementary sulphur), which is absorbed onto cotton from a sodium sulphide vat to give an olive colour. The fastness properties of the dyeings are very good.

EXAMPLE 6

If the procedure followed is as described in Example 1 and a nitroanthraquinone mixture of the composition

| 1- | 1,6- | 1,7- | 2,6- | 2,7- | 1,5- | 1,8- | nitro-/dinitro-anthraquinone |
|---|---|---|---|---|---|---|---|
| 0.8 | 18.7 | 17.5 | 0.8 | 1.1 | 9.7 | 46.3 | % | is employed, a dyestuff having a sulphur content of 34% (8% of elementary sulphur) is obtained.

The dyestuff is absorbed onto cotton from a sodium sulphide vat to give extremely clear olive shades. The levelness and fastness properties of the dyeings are excellent.

EXAMPLE 7

20 g of an aminoanthraquinone mixture, which was obtained in accordance with known methods by reduction of a nitroanthraquinone mixture of the composition given in Example 1, are introduced, at 72° C., into a melt of 80 g of sodium sulphide.9H$_2$O and 40 g of sulphur. During the introduction, the temperature rises to 88° C. The mixture is heated to the boil (=121° C.) in the course of 1½ hours and with a descending condenser for 2½ hours. The temperature thereby rises to 160° C. and 60 ml of water distil off.

The temperature of the melt is then raised to 300° C. in the course of 4 hours, and the melt begins to solidify completely from about 200° C. After heating for 3 hours at 300° C., the solid is cooled to room temperature and treated with 250 ml of H$_2$O. The baked product thereby dissolves. 250 ml of HCl (15% strength) are now slowly added dropwise and the mixture is heated under reflux for 2 hours. The product is filtered off hot, washed with water until the washings are neutral and dried at 110° C. This yields 42 g of a sulphur dyestuff having a total of 66% of sulphur (16% of elementary sulphur), which dyes cotton from the sodium sulphide vat in clear olive shades.

32.3 g of the dyestuff are heated under reflux in 650 ml of toluene for 2½ hours. After hot filtration and washing with toluene and methanol, the product is dried at 110° C. This yields 31 g of a black-brown powder having a sulphur content of 55.3% (virtually no elementary sulphur). The product dyes cotton from a sodium sulphide vat in very clear, strongly greenish-olive shades having outstanding fastness to light and washing.

EXAMPLE 8

70 g of a product, which was obtained from the nitro-anthraquinone mixture given in Example 1 by treatment with magnesium oxide in accordance with DOS (German Published Specification) No. 2,254,199, are introduced, at 86° to 88° C. and in the course of 3 hours, into a melt of 300 g of Na$_2$S.9H$_2$O and 40 g of sulphur. The mixture is heated under reflux for 16 hours and the temperature is then raised to 192° C. in the course of 20 to 25 hours. 162 ml of aqueous liquid thereby distil off. The melt is heated to 270° C. in the course of a further 5 hours, whereupon it gradually becomes hard. After cooling, the batch is taken up in water and treated, whilst stirring, with sufficient HCl (15% strength) to cause the complete precipitation of the dyestuff. The product is filtered off, washed with water until the washings are neutral and dried at 120° C. This yields 110 g of a black dyestuff powder having a total sulphur content of 46% (11% of elementary sulphur). The dyestuff is absorbed onto cotton from a sodium sulphide vat to give a green coloration.

The fastness properties are very good.

The nitroanthraquinone mixture used is prepared in accordance with DE-OS (German Published Specification) No. 2,254,299 in the following manner:

100 g of a residual mixture of the composition given in Example 1 are dissolved in 300 ml of N-methylpyrrolidone. After adding 13.6 g of MgO, the mixture is heated to 115° C. for 3 hours. The batch is then discharged into 1.5 liters of water, the mixture is rendered acid with concentrated HCl and the product is filtered off. After washing until the washings are neutral and drying, 97 g of a hydroxy-nitroanthraquinone mixture are obtained.

EXAMPLE 9

If the procedure followed is as described in Example 8 and a nitroanthraquinone mixture which is hydroxylated and optionally substituted by further nitro groups in accordance with German Pat. No. 842,793 and has the original composition of Example 1 is employed, 103 g of a dyestuff having a sulphur content of 37.4% are obtained from 70 g of product. The dyeing on cotton is brilliant green. The levelness and fastness properties of the dyeings are excellent.

The nitroanthraquinone used, which is hydroxylated and optionally substituted by further nitro groups, is prepared in accordance with German Pat. No. 842,793 in the following manner:

100 g of a residual mixture of the composition given in Example 1 are dissolved in 300 ml of anhydrous N-methylpyrrolidone. After warming to 150° C., 40 g of sodium nitrite are introduced and the mixture is heated to 150° C. for 3 hours.

The mixture is then discharged in a thin stream into a solution of 40 g of ammonium chloride in 1.5 liters of water, whilst stirring vigorously the resulting mixture is acidified with about 100 ml of concentrated HCl and the product is filtered off and washed until the washings are neutral. After drying at 60° C. in vacuo, 93.5 g of a hydroxy-nitroanthraquinone mixture are obtained.

EXAMPLE 10

85 g of Na$_2$S.9H$_2$O are added, at a temperature which increases up to 90° C., to a slurry of 25 g of a residual nitro-anthraquinone mixture of the composition:

| 1-   | 1,5- | 1,6- | 1,7- | 1,8- | 2,6- | 2,7- | nitro-/dinitro-anthraquinone |
|------|------|------|------|------|------|------|------------------------------|
| 0.73 | 8.95 | 27.0 | 21.9 | 31.4 | 1.12 | 1.14 | %                            | in 25 ml of water. 21.2 g of technical-grade $Na_2S$ (approximately 60% pure), 4 g of $CuSO_4$, 7.5 g of NaCl and 16.5 g of sulphur are subsequently introduced.

The mixture is heated to 119° C. in the course of 2 hours, whilst stirring, and then heated to 235° C. in the course of a further 6 hours, water distilling off. The baked melt is heated to 278° C. in the course of a further hour and kept at this temperature for 3 hours. After cooling, 300 ml of $H_2O$ and 200 ml of HCl (32% strength) are added, the mixture is heated under reflux for 1 hour and the product is filtered off hot. After washing with $H_2O$ and drying, 41.8 g of sulphur dyestuff having a sulphur content of 52.7% are obtained.

The dyestuff is absorbed onto cotton from a $Na_2S$ vat to give extremely clear, strongly greenish olive shades. Fastness to wet processing and to light are outstanding.

We claim:
1. A sulphur dyestuff obtained by:
    a. dinitrating anthraquinone;
    b. partially removing 1,5- and 1,8- and 1,6- and 1,7-dinitroanthraquinones; and
    c. sulphurizing the residual mixture which contains 25 to 60% by weight of 1,6-/1,7-dinitroanthraquinones, 60 to 25% by weight of 1,5-/1,8-dinitroanthraquinones, the total content of 1,X-(X=5,6,7,8) dinitroanthraquinones being 50 to 85% by weight, and 2 to 6% by weight of 2,6-/2,7-dinitroanthraquinones.

* * * * *